United States Patent
Fu et al.

(10) Patent No.: US 11,243,529 B2
(45) Date of Patent: Feb. 8, 2022

(54) SELF-DRIVING MOTOR VEHICLE AND TERMINAL WITH PRECISION COMPARISON

(71) Applicant: Huawei Technologies Co., Ltd., Shenzhen (CN)

(72) Inventors: Jiali Fu, Shenzhen (CN); Huimin Zhang, Shenzhen (CN); Maosheng Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 16/712,574

(22) Filed: Dec. 12, 2019

(65) Prior Publication Data
US 2020/0133258 A1 Apr. 30, 2020

Related U.S. Application Data

(63) Continuation of application No. PCT/CN2018/090968, filed on Jun. 13, 2018.

(30) Foreign Application Priority Data

Jun. 16, 2017 (CN) .......................... 201710458710.2

(51) Int. Cl.
*G05D 1/00* (2006.01)
*B60W 50/08* (2020.01)
(Continued)

(52) U.S. Cl.
CPC ......... *G05D 1/0016* (2013.01); *B60W 50/082* (2013.01); *G01S 5/009* (2013.01);
(Continued)

(58) Field of Classification Search
CPC .. G05D 1/0016; G05D 1/0022; G05D 1/0027; G05D 1/0061; G05D 1/0295;
(Continued)

(56) References Cited

U.S. PATENT DOCUMENTS 6,128,559 A 10/2000 Saitou et al.
9,165,470 B2 * 10/2015 Mudalige ............. G05D 1/0293
(Continued)

FOREIGN PATENT DOCUMENTS

CN 1303077 A 7/2001
CN 1918454 A 2/2007
(Continued)

OTHER PUBLICATIONS

Machine Translation and Abstract of Chinese Publication No. CN1303077, Jul. 11, 2001, 6 pages.
(Continued)

*Primary Examiner* — Jess Whittington
*Assistant Examiner* — Divya A Patel
(74) *Attorney, Agent, or Firm* — Conley Rose, P.C.

(57) ABSTRACT

A motor vehicle self-driving method comprises obtaining a first positioning mode and a first driving route; obtaining second vehicle information of a second motor vehicle, where the second vehicle information includes a second positioning mode and a second driving route; determining whether the first driving route overlaps with the second driving route; when the first driving route overlaps with the second driving route, comparing positioning precision of the first positioning mode with positioning precision of the second positioning mode; determining a positioning mode with higher positioning precision in the first positioning mode and the second positioning mode as a target positioning mode; determining a target driving parameter based on the target positioning mode; and controlling the first motor vehicle and the second motor vehicle to drive based on the target driving parameter.

20 Claims, 2 Drawing Sheets

(51) Int. Cl.
*G01S 5/00* (2006.01)
*G05D 1/02* (2020.01)

(52) U.S. Cl.
CPC ......... *G05D 1/0022* (2013.01); *G05D 1/0027* (2013.01); *G05D 1/0061* (2013.01); *G05D 1/0295* (2013.01); *B60W 2556/50* (2020.02)

(58) Field of Classification Search
CPC ........ G05D 1/0213; G08G 1/22; G08G 1/127; B60W 50/082; B60W 2556/50; G01S 5/009
See application file for complete search history.

(56) References Cited

U.S. PATENT DOCUMENTS

| | | | |
|---|---|---|---|
| 9,470,531 B2* | 10/2016 | Moerman | G01C 21/20 |
| 2008/0051990 A1* | 2/2008 | Nomura | G01C 21/20 701/533 |
| 2011/0301779 A1 | 12/2011 | Shida | |
| 2013/0030606 A1 | 1/2013 | Mudalige et al. | |
| 2013/0090802 A1 | 4/2013 | Curtis et al. | |
| 2014/0350848 A1 | 11/2014 | Moerman | |
| 2016/0209849 A1 | 7/2016 | Arbogast et al. | |
| 2017/0131406 A1* | 5/2017 | Li | G01C 21/26 |

FOREIGN PATENT DOCUMENTS

| | | | |
|---|---|---|---|
| CN | 102901510 A | 1/2013 | |
| CN | 103675878 A | 3/2014 | |
| CN | 104180813 A | 12/2014 | |
| CN | 104269050 A | 1/2015 | |
| CN | 105788328 A | 7/2016 | |
| CN | 105933862 A | 9/2016 | |
| CN | 105974453 A | 9/2016 | |
| CN | 106504520 A | 3/2017 | |
| CN | 106708057 A | 5/2017 | |
| CN | 107145150 A | 9/2017 | |
| DE | 102007046763 A1 | 4/2009 | |
| JP | 2006017735 A | 1/2006 | |

OTHER PUBLICATIONS

Machine Translation and Abstract of Chinese Publication No. CN103675878, Mar. 26, 2014, 16 pages.
Machine Translation and Abstract of Chinese Publication No. CN104269050, Jan. 7, 2015, 17 pages.
Machine Translation and Abstract of Chinese Publication No. CN105788328, Jul. 20, 2016, 19 pages.
Machine Translation and Abstract of Chinese Publication No. CN105933862, Sep. 7, 2016, 22 pages.
Machine Translation and Abstract of Chinese Publication No. CN106504520, Mar. 15, 2017, 18 pages.
Machine Translation and Abstract of Chinese Publication No. CN106708057, May 24, 2017, 20 pages.
Machine Translation and Abstract of Chinese Publication No. CN107145150, Sep. 8, 2017, 27 pages.
Machine Translation and Abstract of Japanese Publication No. JP2006017735, Jan. 19, 2006, 36 pages.
Foreign Communication From A Counterpart Application, Chinese Application No. 201710458710.2, Chinese Office Action dated Sep. 23, 2019, 6 pages.
Foreign Communication From A Counterpart Application, PCT Application No. PCT/CN2018/090968, English Translation of International Search Report dated Sep. 7, 2018, 2 pages.
Foreign Communication From A Counterpart Application, PCT Application No. PCT/CN2018/090968, English Translation of Written Opinion dated Sep. 7, 2018, 4 pages.

* cited by examiner

SELF-DRIVING MOTOR VEHICLE AND TERMINAL WITH PRECISION COMPARISON

CROSS-REFERENCE TO RELATED APPLICATIONS

This application is a continuation of International Patent Application No. PCT/CN2018/090968, filed on Jun. 13, 2018, which claims priority to Chinese Patent Application No. 201710458710.2, filed on Jun. 16, 2017. The disclosures of the aforementioned applications are hereby incorporated by reference in their entireties.

TECHNICAL FIELD

This application relates to the field of vehicle control technologies, and in particular, to a motor vehicle self-driving method and a terminal device.

BACKGROUND

A self-driving technology relies on cooperation of artificial intelligence, visual computing, radar, a monitoring apparatus, and a Global Positioning System (GPS) such that a motor vehicle can implement self-driving without an active manual operation. Because the self-driving technology does not require a human to drive the motor vehicle, a human driving failure can be effectively avoided in theory, a traffic accident can be reduced, and road transportation efficiency can be improved. Therefore, the self-driving technology attracts increasing attention.

Currently, in a related technology, under the guidance of a detailed map, the motor vehicle determines a driving parameter of the motor vehicle based on a positioning mode to implement self-driving of the motor vehicle. To ensure safety of the motor vehicle during self-driving, the motor vehicle needs to use a positioning mode with high positioning precision, such as a network-assisted GPS positioning mode.

Higher positioning precision of a positioning mode used by the motor vehicle during self-driving requires higher costs. For example, when the network-assisted GPS positioning mode is used, hardware devices such as a GPS receiver and a wireless interface need to be equipped to receive and transmit necessary data. Therefore, how to reduce costs of the motor vehicle during self-driving while ensuring driving safety of the motor vehicle becomes a difficult problem in the field of self-driving technologies.

SUMMARY

Embodiments of this application provide a motor vehicle self-driving method and a terminal device, to reduce costs while ensuring vehicle safety.

According to a first aspect, an embodiment of this application provides a motor vehicle self-driving method, including obtaining, by a terminal device, first vehicle information of a first motor vehicle, where the first vehicle information includes a first positioning mode and a first driving route; obtaining, by the terminal device, second vehicle information of a second motor vehicle, where the second motor vehicle is located in a preset range of the first motor vehicle, and the second vehicle information includes a second positioning mode and a second driving route; determining, by the terminal device, whether the first driving route overlaps with the second driving route; when the first driving route overlaps with the second driving route, comparing, by the terminal device, positioning precision of the first positioning mode with positioning precision of the second positioning mode; determining, by the terminal device, a positioning mode with higher positioning precision in the first positioning mode and the second positioning mode as a target positioning mode; determining, by the terminal device, a target driving parameter based on the target positioning mode; and controlling, by the terminal device, the first motor vehicle and the second motor vehicle to drive based on the target driving parameter.

According to the motor vehicle self-driving method provided in this embodiment of this application, the terminal device obtains the first vehicle information of the first motor vehicle, where the first vehicle information includes the first positioning mode and the first driving route; the terminal device obtains the second vehicle information of the second motor vehicle, where the second motor vehicle is located in the preset range of the first motor vehicle, and the second vehicle information includes the second positioning mode and the second driving route; the terminal device determines whether the first driving route overlaps with the second driving route; when the first driving route overlaps with the second driving route, the terminal device compares the positioning precision of the first positioning mode with the positioning precision of the second positioning mode; the terminal device determines a positioning mode with higher positioning precision in the first positioning mode and the second positioning mode as the target positioning mode; the terminal device determines the target driving parameter based on the target positioning mode; and the terminal device controls the first motor vehicle and the second motor vehicle to drive based on the target driving parameter.

In this embodiment of this application, the terminal device determines the target driving parameter based on the target positioning mode, and the target positioning mode is a positioning mode with higher positioning precision in the first positioning mode and the second positioning mode. Therefore, security is relatively high when the terminal device controls the first motor vehicle and the second motor vehicle to drive based on the target driving parameter that is determined based on the target positioning mode. In addition, because the terminal device can control both the first motor vehicle and the second motor vehicle to drive based on the target driving parameter that is determined based on the target positioning mode, neither the first motor vehicle nor the second motor vehicle needs to use a high positioning mode, and therefore costs are relatively low.

Optionally, in a specific implementation of this embodiment of this application, the first vehicle information further includes first environment data of the first motor vehicle, and the second vehicle information further includes second environment data of the second motor vehicle; and the determining, by the terminal device, a target driving parameter based on the target positioning mode includes, when the target positioning mode is the first positioning mode, determining, by the terminal device, the target driving parameter based on the target positioning mode and the first environment data; or when the target positioning mode is the second positioning mode, determining, by the terminal device, the target driving parameter based on the target positioning mode and the second environment data.

In this specific implementation, the terminal device determines the target driving parameter of the first motor vehicle and the second motor vehicle based on a positioning mode with higher positioning precision and corresponding environment data. Therefore, the target driving parameter varies with different environment data, and further matches an external environment, thereby improving self-driving security of the first motor vehicle and the second motor vehicle.

Optionally, in a specific implementation of this embodiment of this application, the determining, by the terminal device, the target driving parameter based on the target positioning mode and the first environment data includes determining, by the terminal device, a first driving parameter based on the target positioning mode; determining, by the terminal device, whether the first environment data includes a preset environment characteristic; and when the first environment data includes the preset environment characteristic, determining, by the terminal device, a first driving parameter offset based on the preset environment characteristic and the first driving parameter, and adding the first driving parameter and the first driving parameter offset to obtain the target driving parameter; or when the first environment data does not include the preset environment characteristic, using, by the terminal device, the first driving parameter as the target driving parameter; or the determining, by the terminal device, the target driving parameter based on the target positioning mode and the second environment data includes determining, by the terminal device, a second driving parameter based on the target positioning mode; determining, by the terminal device, whether the second environment data includes the preset environment characteristic; and when the second environment data includes the preset environment characteristic, determining, by the terminal device, a second driving parameter offset based on the preset environment characteristic and the second driving parameter, and adding the second driving parameter and the second driving parameter offset to obtain the target driving parameter; or when the second environment data does not include the preset environment characteristic, using, by the terminal device, the second driving parameter as the target driving parameter.

In this specific implementation, when the first environment data or the second environment data includes the preset environment characteristic, a corresponding driving parameter offset is calculated based on the preset environment characteristic, and then the driving parameter offset and an initial driving parameter (the first driving parameter or the second driving parameter) are added to obtain the target driving parameter. When the first environment data or the second environment data does not include the preset environment characteristic, the first driving parameter or the second driving parameter is directly used as the target driving parameter. In other words, the initial driving parameter is adjusted only when the first environment data or the second environment data includes the preset environment characteristic, thereby avoiding a case in which the initial driving parameter is adjusted once an environment changes.

Optionally, in a specific implementation of this embodiment of this application, the method further includes determining, by the terminal device based on the first environment data or the second environment data, whether a vehicle self-driving condition is met, and when the vehicle self-driving condition is not met, prompting, by the terminal device, the first motor vehicle and the second motor vehicle to enter a manual driving mode.

In this specific implementation, when the first environment data or the second environment data does not meet the vehicle self-driving condition, the terminal device prompts a driver to manually drive the first motor vehicle and the second motor vehicle such that driving safety of a motor vehicle can be further improved.

Optionally, in a specific implementation of this embodiment of this application, the method further includes, when the first driving route is separated from the second driving route, stopping, by the terminal device, controlling the first motor vehicle or the second motor vehicle to drive based on the target driving parameter.

In this specific implementation, when the first driving route is separated from the second driving route, the terminal device stops controlling the first motor vehicle or the second motor vehicle to drive based on the target driving parameter. This avoids a case in which self-driving safety is reduced because a driving parameter of the first motor vehicle or a driving parameter of the second motor vehicle does not match a corresponding positioning mode after the first driving route is separated from the second driving route.

Optionally, in a specific implementation of this embodiment of this application, the method further includes obtaining, by the terminal device, third vehicle information of a third motor vehicle, where the third motor vehicle is located in the preset range of the first motor vehicle, and the third vehicle information includes a third positioning mode and a third driving route; determining, by the terminal device, whether the first driving route overlaps with the third driving route; when the first driving route overlaps with the third driving route, comparing, by the terminal device, positioning precision of the target positioning mode with positioning precision of the third positioning mode; and when the positioning precision of the target positioning mode is higher than the positioning precision of the third positioning mode, controlling, by the terminal device, the third motor vehicle to drive based on the target driving parameter; or when the positioning precision of the target positioning mode is lower than the positioning precision of the third positioning mode, determining, by the terminal device, a current driving parameter based on the third positioning mode; and controlling, by the terminal device, the first motor vehicle, the second motor vehicle, and the third motor vehicle to drive based on the current driving parameter.

In this specific implementation, when the third driving route overlaps with the first driving route, the terminal device determines a driving parameter based on the positioning precision of the third positioning mode and the positioning precision of the target positioning mode and based on a positioning mode with higher positioning precision. Therefore, self-driving safety is high when the terminal device controls the first motor vehicle, the second motor vehicle, and the third motor vehicle to drive based on the determined driving parameter.

Optionally, in a specific implementation of this embodiment of this application, the controlling, by the terminal device, the first motor vehicle and the second motor vehicle to drive based on the target driving parameter includes when the target positioning mode is the first positioning mode, using, by the terminal device, the first motor vehicle as a head vehicle and controlling the first motor vehicle and the second motor vehicle to drive based on the target driving parameter; or when the target positioning mode is the second positioning mode, using, by the terminal device, the second motor vehicle as a head vehicle and controlling the first motor vehicle and the second motor vehicle to drive based on the target driving parameter.

In this specific implementation, when controlling the first motor vehicle and the second motor vehicle to drive based on the target driving parameter, the terminal device uses a motor vehicle with higher positioning precision as a head vehicle. Because positioning precision of the head vehicle is high, self-driving security of the first motor vehicle and the second motor vehicle is relatively high in this specific implementation.

According to a second aspect, an embodiment of this application provides a terminal device, including: an obtaining module, configured to obtain first vehicle information of a first motor vehicle, where the first vehicle information includes a first positioning mode and a first driving route; and obtain second vehicle information of a second motor vehicle, where the second motor vehicle is located in a preset range of the first motor vehicle, and the second vehicle information includes a second positioning mode and a second driving route; and a processing module, configured to determine whether the first driving route overlaps with the second driving route; when the first driving route overlaps with the second driving route, compare positioning precision of the first positioning mode with positioning precision of the second positioning mode; determine a positioning mode with higher positioning precision in the first positioning mode and the second positioning mode as a target positioning mode; determine a target driving parameter based on the target positioning mode; and control the first motor vehicle and the second motor vehicle to drive based on the target driving parameter.

According to the terminal device provided in this embodiment of this application, the obtaining module obtains the first vehicle information of the first motor vehicle, where the first vehicle information includes the first positioning mode and the first driving route; and obtains the second vehicle information of the second motor vehicle, where the second motor vehicle is located in the preset range of the first motor vehicle, and the second vehicle information includes the second positioning mode and the second driving route; and the processing module determines whether the first driving route overlaps with the second driving route; when the first driving route overlaps with the second driving route, compares the positioning precision of the first positioning mode with the positioning precision of the second positioning mode; determines a positioning mode with higher positioning precision in the first positioning mode and the second positioning mode as the target positioning mode; determines the target driving parameter based on the target positioning mode; and controls the first motor vehicle and the second motor vehicle to drive based on the target driving parameter.

In this embodiment of this application, the terminal device determines the target driving parameter based on the target positioning mode, and the target positioning mode is a positioning mode with higher positioning precision in the first positioning mode and the second positioning mode. Therefore, security is relatively high when the terminal device controls the first motor vehicle and the second motor vehicle to drive based on the target driving parameter that is determined based on the target positioning mode. In addition, because the terminal device can control both the first motor vehicle and the second motor vehicle to drive based on the target driving parameter that is determined based on the target positioning mode, neither the first motor vehicle nor the second motor vehicle needs to use a high positioning mode, and therefore costs are relatively low.

Optionally, in a specific implementation of this embodiment of this application, the first vehicle information further includes first environment data of the first motor vehicle, and the second vehicle information further includes second environment data of the second motor vehicle, and the processing module is further configured to, when the target positioning mode is the first positioning mode, determine the target driving parameter based on the target positioning mode and the first environment data, or when the target positioning mode is the second positioning mode, determine the target driving parameter based on the target positioning mode and the second environment data.

Optionally, in a specific implementation of this embodiment of this application, the processing module is further configured to determine a first driving parameter based on the target positioning mode; determine whether the first environment data includes a preset environment characteristic; and when the first environment data includes the preset environment characteristic, determine a first driving parameter offset based on the preset environment characteristic and the first driving parameter, and add the first driving parameter and the first driving parameter offset to obtain the target driving parameter; or when the first environment data does not include the preset environment characteristic, use the first driving parameter as the target driving parameter; or the processing module is further configured to determine a second driving parameter based on the target positioning mode; determine whether the second environment data includes the preset environment characteristic; and when the second environment data includes the preset environment characteristic, determine a second driving parameter offset based on the preset environment characteristic and the second driving parameter, and add the second driving parameter and the second driving parameter offset to obtain the target driving parameter; or when the second environment data does not include the preset environment characteristic, use the second driving parameter as the target driving parameter.

Optionally, in a specific implementation of this embodiment of this application, the processing module is further configured to determine, based on the first environment data and/or the second environment data, whether a vehicle self-driving condition is met; and when the vehicle self-driving condition is not met, prompt the first motor vehicle and the second motor vehicle to enter a manual driving mode.

Optionally, in a specific implementation of this embodiment of this application, the processing module is further configured to, when the first driving route is separated from the second driving route, stop controlling the first motor vehicle or the second motor vehicle to drive based on the target driving parameter.

Optionally, in a specific implementation of this embodiment of this application, the obtaining module is further configured to obtain third vehicle information of a third motor vehicle, where the third motor vehicle is located in the preset range of the first motor vehicle, and the third vehicle information includes a third positioning mode and a third driving route; and the processing module is further configured to determine whether the first driving route overlaps with the third driving route; when the first driving route overlaps with the third driving route, compare positioning precision of the target positioning mode with positioning precision of the third positioning mode; and when the positioning precision of the target positioning mode is higher than the positioning precision of the third positioning mode, control the third motor vehicle to drive based on the target driving parameter; or when the positioning precision of the target positioning mode is lower than the positioning precision of the third positioning mode, determine a current driving parameter based on the third positioning mode; and control the first motor vehicle, the second motor vehicle, and the third motor vehicle to drive based on the current driving parameter.

Optionally, in a specific implementation of this embodiment of this application, the processing module is further configured to, when the target positioning mode is the first positioning mode, use the first motor vehicle as a head vehicle and control the first motor vehicle and the second motor vehicle to drive based on the target driving parameter; or when the target positioning mode is the second positioning mode, use the second motor vehicle as a head vehicle and control the first motor vehicle and the second motor vehicle to drive based on the target driving parameter.

According to a third aspect, an embodiment of this application provides a computer storage medium. The computer storage medium may store a program, and when the program is executed, the motor vehicle self-driving method in any one of the embodiments of the first aspect of this application may be implemented.

BRIEF DESCRIPTION OF DRAWINGS

To describe the technical solutions in the embodiments of this application more clearly, the following briefly describes the accompanying drawings. A person of ordinary skill in the art may still derive other drawings from these accompanying drawings without creative efforts.

DESCRIPTION OF EMBODIMENTS

The following clearly describes the technical solutions in the embodiments of this application with reference to the accompanying drawings in the embodiments of this application.

Figure 1:
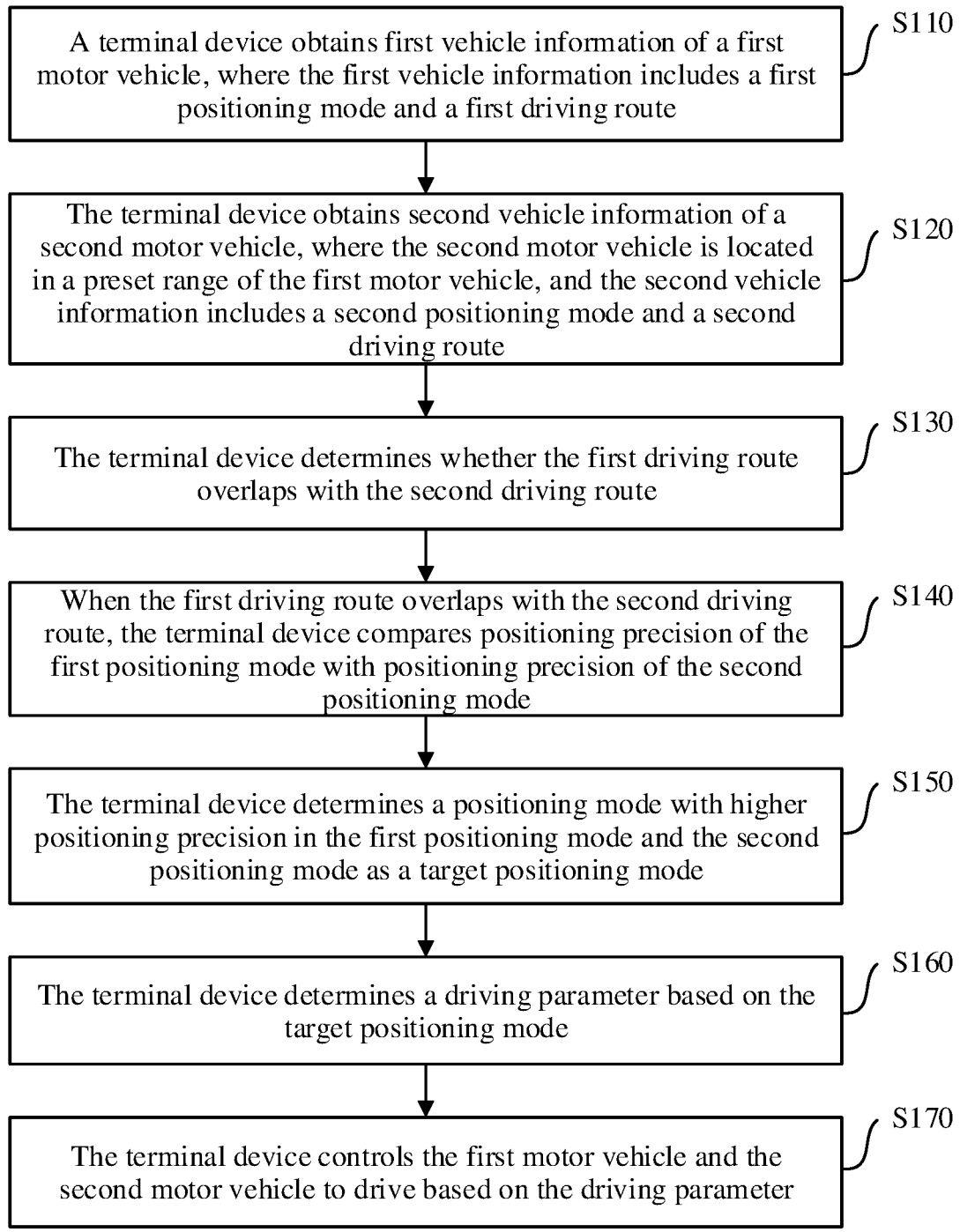
FIG. 1 is a schematic flowchart of a motor vehicle self-driving method according to an embodiment of this application.

FIG. 1 is a schematic flowchart of a motor vehicle self-driving method according to an embodiment of this application. The motor vehicle self-driving method is performed by a terminal device. The terminal device may be located outside a first motor vehicle and a second motor vehicle, or may be located inside a first motor vehicle. In a specific implementation process of this embodiment of this application, this embodiment of this application may include the following steps.

In step S110, the terminal device obtains first vehicle information of the first motor vehicle, where the first vehicle information includes a first positioning mode and a first driving route.

In a specific implementation process of this embodiment of this application, if the terminal device is disposed inside the first motor vehicle, a first positioning module and a first human-computer interaction module may be disposed on the terminal device, to locate the first motor vehicle and set the first driving route.

Specifically, the first positioning module may locate the first motor vehicle by interacting with a network device. The network device herein may be a base station, an enhanced base station, a relay with a scheduling function, a device with a base station function, or the like, or may be a satellite, or may include a base station and a satellite. The satellite may be a satellite in a beidou navigation satellite system (BDS), a satellite in a GPS, or a satellite in a global navigation satellite system (GLONASS). This is not limited in this embodiment of this application. In an embodiment, there are a plurality of network devices. For example, when a positioning function is provided for the terminal device using a satellite, there are at least four network devices, or when a positioning function is provided for the terminal device using a base station, there are at least three network devices. Different first positioning modules correspond to different first positioning modes.

The first human-computer interaction module provides an entering function for a user, and the user may learn of the first driving route after entering a destination or a journey route. In an embodiment, the first human-computer interaction module may be represented in a plurality of manners. For example, the first human-computer interaction module may perform human-computer interaction using a graphical user interface (GUI), or may perform human-computer interaction through voice recognition.

It should be further noted that when the terminal device is disposed inside the first motor vehicle, the first positioning module and the first human-computer interaction module may be independent of the terminal device, and then the terminal device communicates with the first positioning module and the first human-computer interaction module through a bus or in another manner, to obtain the first positioning mode and the first driving route.

When the terminal device is disposed outside the first motor vehicle, a first communications module that can communicate with the terminal device may be disposed inside the first motor vehicle. After the first positioning module and the first human-computer interaction module obtain the first positioning mode and the first driving route, the first communications module sends the first vehicle information including the first positioning mode and the first driving route to the terminal device.

In addition, in a specific implementation process of this embodiment of this application, the first vehicle information in step S110 may further include other information. For example, the first vehicle information may further include information such as first environment data of the first motor vehicle, an identification (ID) of the first motor vehicle, and/or a first driving rate. Information such as the first environment data and/or the first driving rate may be implemented by a camera and/or various sensors.

In step S120, the terminal device obtains second vehicle information of the second motor vehicle, where the second motor vehicle is located in a preset range of the first motor vehicle, and the second vehicle information includes a second positioning mode and a second driving route.

The preset range herein means that the second motor vehicle is located at a distance (for example, 20 meters (m)) ahead or behind the first motor vehicle, or means that the second motor vehicle is located in a circle in which the first motor vehicle is used as a center and a radius is a second distance (for example, 10 m). The second motor vehicle is confined to the preset range of the first motor vehicle such that the terminal device subsequently controls both the first motor vehicle and the second motor vehicle to drive based on a specified driving parameter.

In a specific implementation process of this embodiment of this application, a second positioning module and a second human-computer interaction module may be disposed on the second motor vehicle, to locate the second motor vehicle and set the second driving route. A second communication module that can communicate with the terminal device may be disposed on the second motor vehicle. After the first positioning module and the first human-computer interaction module obtain the second positioning mode and the second driving route, the second communication module sends the second vehicle information including the second positioning mode and the second driving route to the terminal device.

Specifically, the second positioning module may locate the second motor vehicle by interacting with a network device. The network device herein may be a base station, an enhanced base station, a relay with a scheduling function, a device with a base station function, or the like, or may be a satellite, or may include a base station and a satellite. The satellite may be a satellite in a BDS, a satellite in a GPS, or a satellite in a GLONASS. This is not limited in this embodiment of this application. In an embodiment, there are a plurality of network devices. For example, when a positioning function is provided for the terminal device using a satellite, there are at least four network devices, or when a positioning function is provided for the terminal device using a base station, there are at least three network devices. Different second positioning modules correspond to different second positioning modes.

The second human-computer interaction module provides an entering function for a user, and the user may learn of the second driving route after entering a destination or a journey route. In an embodiment, the second human-computer interaction module may be represented in a plurality of manners. For example, the second human-computer interaction module may perform human-computer interaction using a GUI, or may perform human-computer interaction through voice recognition.

In addition, in a specific implementation process of this embodiment of this application, the second vehicle information in step S120 may further include other information. For example, the second vehicle information may further include information such as second environment data of the second motor vehicle, an ID of the second motor vehicle, and/or a second driving rate. Information such as the second environment data and/or the second driving rate may be implemented by a camera and/or various sensors.

In step S130, the terminal device determines whether the first driving route overlaps with the second driving route.

The overlapping herein is partial overlapping or complete overlapping.

In step S140, when the first driving route overlaps with the second driving route, the terminal device compares positioning precision of the first positioning mode with positioning precision of the second positioning mode.

In a specific implementation process of step S140, a correspondence between a positioning mode and positioning precision may be prestored in the terminal device. After the terminal device obtains the first positioning mode and the second positioning mode, the terminal device directly determines the positioning precision of the first positioning mode and the positioning precision of the second positioning mode based on the correspondence between a positioning mode and positioning precision, and compares the positioning precision of the first positioning mode with the positioning precision of the second positioning mode. Certainly, in a specific implementation process of this embodiment of this application, an implementation of step S140 is not limited thereto. For example, the obtained first vehicle information may directly include the positioning precision of the first positioning mode, and the second vehicle information may directly include the positioning precision of the second positioning mode. In this case, after obtaining the first vehicle information and the second vehicle information, the terminal device may directly determine the positioning precision of the first positioning mode and the positioning precision of the second positioning mode.

In step S150, the terminal device determines a positioning mode with higher positioning precision in the first positioning mode and the second positioning mode as a target positioning mode.

For ease of understanding, step S350 is described herein using an example. For example, the first positioning mode is GPS+base station, and positioning precision of the first positioning mode is 10 m. The second positioning mode is GPS outdoor positioning, and precision of the second positioning mode is 50 m. In this case, the terminal device determines the first positioning mode as the target positioning mode.

In step S160, the terminal device determines a target driving parameter based on the target positioning mode.

In an embodiment, the target driving parameter determined in step S360 may include a vehicle speed, a vehicle distance, a vehicle width, and/or the like. In a specific implementation process of this embodiment of this application, step S360 may be implemented in a plurality of manners.

For example, in a specific implementation of this embodiment of this application, a correspondence between a positioning mode and a driving parameter may be prestored in the terminal device. After determining the target positioning mode, the terminal device may determine the target driving parameter based on the target positioning mode and the correspondence between a positioning mode and a driving parameter.

For another example, in another specific implementation of this embodiment of this application, a correspondence between a positioning mode and positioning precision and a function relationship between positioning precision and a driving parameter may be prestored in the terminal device. After determining the target positioning mode, the terminal device may first determine the positioning precision based on the target positioning mode and the correspondence between a positioning mode and positioning precision, and then determine the target driving parameter based on the function relationship between positioning precision and a driving parameter.

For another example, in still another specific implementation of this embodiment of this application, when the first vehicle information further includes the first environment data of the first motor vehicle, and the second vehicle information further includes the second environment data of the second motor vehicle, step S160 may include, when the target positioning mode is the first positioning mode, the terminal device determines the target driving parameter based on the target positioning mode and the first environment data, or when the target positioning mode is the second positioning mode, the terminal device determines the target driving parameter based on the target positioning mode and the second environment data.

In this implementation, that the terminal device determines the target driving parameter based on the target positioning mode and the first environment data may include that the terminal device determines a first driving parameter based on the target positioning mode, the terminal device determines whether the first environment data includes a preset environment characteristic, and when the first environment data includes the preset environment characteristic, the terminal device determines a first driving parameter offset based on the preset environment characteristic and the first driving parameter, and adds the first driving parameter and the first driving parameter offset to obtain the target driving parameter, or when the first environment data does not include the preset environment characteristic, the terminal device uses the first driving parameter as the target driving parameter. That the terminal device determines the target driving parameter based on the target positioning mode and the second environment data may include that the terminal device determines a second driving parameter based on the target positioning mode, the terminal device determines whether the second environment data includes a preset environment characteristic, and when the second environment data includes the preset environment characteristic, the terminal device determines a second driving parameter offset based on the preset environment characteristic and the second driving parameter, and adds the second driving parameter and the second driving parameter offset to obtain the target driving parameter, or when the second environment data does not include the preset environment characteristic, the terminal device uses the second driving parameter as the target driving parameter. The preset environment characteristic herein may be one or more of snow, rain, a typhoon, a high temperature (above 38° celsius (C)), an extremely low temperature (below −10° C.), a tall building, a remote mountainous area, and a tunnel.

In this specific implementation, a correspondence between a positioning mode and an initial driving parameter (for example, the first driving parameter or the second driving parameter) and a function relationship between a driving parameter offset and both an initial driving parameter and a preset environment characteristic may be pre-stored in the terminal device. The terminal device may calculate the first driving parameter offset or the second driving parameter offset based on the correspondence between a positioning mode and an initial driving parameter and the function relationship between a driving parameter offset and both an initial driving parameter and a preset environment characteristic, and finally calculate the required target driving parameter.

In step S170, the terminal device controls the first motor vehicle and the second motor vehicle to drive based on the target driving parameter.

In a specific implementation process of this embodiment of this application, step S170 may be implemented in a plurality of manners. For example, in a specific implementation of this embodiment of this application, step S170 may include, when the target positioning mode is the first positioning mode, the terminal device uses the first motor vehicle as a head vehicle and controls the first motor vehicle and the second motor vehicle to drive based on the target driving parameter, or when the target positioning mode is the second positioning mode, the terminal device uses the second motor vehicle as a head vehicle and controls the first motor vehicle and the second motor vehicle to drive based on the target driving parameter.

For another example, in another specific implementation of this embodiment of this application, step S170 may include the terminal device uses the first motor vehicle as a head vehicle and controls the first motor vehicle and the second motor vehicle to drive based on the target driving parameter.

The head vehicle in this embodiment of this application is further a vehicle that travels ahead.

According to the motor vehicle self-driving method provided in this embodiment of this application, the terminal device obtains the first vehicle information of the first motor vehicle, where the first vehicle information includes the first positioning mode and the first driving route. The terminal device obtains the second vehicle information of the second motor vehicle, where the second motor vehicle is located in the preset range of the first motor vehicle, and the second vehicle information includes the second positioning mode and the second driving route. The terminal device determines whether the first driving route overlaps with the second driving route, when the first driving route overlaps with the second driving route, the terminal device compares the positioning precision of the first positioning mode with the positioning precision of the second positioning mode. The terminal device determines a positioning mode with higher positioning precision in the first positioning mode and the second positioning mode as the target positioning mode. The terminal device determines the target driving parameter based on the target positioning mode, and the terminal device controls the first motor vehicle and the second motor vehicle to drive based on the target driving parameter.

In this embodiment of this application, the terminal device determines the target driving parameter based on the target positioning mode, and the target positioning mode is a positioning mode with higher positioning precision in the first positioning mode and the second positioning mode. Therefore, security is relatively high when the terminal device controls the first motor vehicle and the second motor vehicle to drive based on the target driving parameter that is determined based on the target positioning mode. In addition, because the terminal device can control both the first motor vehicle and the second motor vehicle to drive based on the target driving parameter that is determined based on the target positioning mode, neither the first motor vehicle nor the second motor vehicle needs to use a high positioning mode, and therefore costs are relatively low.

In an embodiment, because an external environment is quite tough, positioning precision of a motor vehicle may be quite low. In this case, if the motor vehicle still uses a self-driving mode, safety of the motor vehicle cannot be ensured. In view of the above, in a specific implementation of this embodiment of this application, the embodiment shown in FIG. 1 may further include the terminal device determines, based on the first environment data and/or the second environment data, whether a vehicle self-driving condition is met, and when the vehicle self-driving condition is not met, the terminal device prompts the first motor vehicle and the second motor vehicle to enter a manual driving mode.

Specifically, the vehicle self-driving condition herein may be determined based on an actual situation. For example, the vehicle self-driving condition may be defined based on accident rates in various environments. For example, environment data whose accident rate is lower than 0.0001 is defined as environment data that meets the vehicle self-driving condition, and environment data whose accident rate is higher than 0.0001 is defined as environment data that does not meet the vehicle self-driving condition. When the vehicle self-driving condition is not met, the terminal device may send control instructions to the first motor vehicle and the second motor vehicle such that a corresponding device in the first motor vehicle and a corresponding device in the second motor vehicle give a prompt such as a sound or vibration, to prompt the first motor vehicle and the second motor vehicle to enter the manual driving mode.

In addition, after the first driving route is separated from the second driving route, because the first motor vehicle and the second motor vehicle continue to drive based on the target driving parameter determined in step S160, a driving parameter of the first motor vehicle or a driving parameter of the second motor vehicle does not match a corresponding positioning manner, and consequently self-driving security is reduced. To avoid this case, the embodiment shown in FIG. 1 may further include, when the first driving route is separated from the second driving route, the terminal device stops controlling the first motor vehicle or the second motor vehicle to drive based on the target driving parameter.

Certainly, in a specific implementation process of this embodiment of this application, there are many other specific implementations. For example, optionally, in a specific implementation of this embodiment of this application, the embodiment shown in FIG. 1 may further include that the terminal device obtains third vehicle information of a third motor vehicle, where the third motor vehicle is located in the preset range of the first motor vehicle, and the third vehicle information includes a third positioning mode and a third driving route. The terminal device determines whether the first driving route overlaps with the third driving route. When the first driving route overlaps with the third driving route, the terminal device compares positioning precision of the target positioning mode with positioning precision of the third positioning mode, and when the positioning precision of the target positioning mode is higher than the positioning precision of the third positioning mode, the terminal device controls the third motor vehicle to drive based on the target driving parameter, or when the positioning precision of the target positioning mode is lower than the positioning precision of the third positioning mode, the terminal device determines a current driving parameter based on the third positioning mode, and the terminal device controls the first motor vehicle, the second motor vehicle, and the third motor vehicle to drive based on the current driving parameter.

In this specific implementation, when the third driving route overlaps with the first driving route, the terminal device determines a driving parameter based on the positioning precision of the third positioning mode and the positioning precision of the target positioning mode and based on a positioning mode with higher positioning precision. Therefore, self-driving safety is high when the terminal device controls the first motor vehicle, the second motor vehicle, and the third motor vehicle to drive based on the determined driving parameter.

For another example, in another specific implementation of this embodiment of this application, to improve self-driving security of the first motor vehicle, when determining the target positioning mode, the terminal device may determine the second positioning mode as the target positioning mode only when the positioning precision of the second positioning mode is higher than the positioning precision of the first positioning mode. However, when the positioning precision of the second positioning mode is lower than the positioning precision of the first positioning mode, the terminal device determines a driving parameter based on the first positioning mode, and finally the terminal device controls only the first motor vehicle to drive based on the determined driving parameter.

Corresponding to the foregoing method embodiment, an embodiment of this application further provides an embodiment of a corresponding terminal device.

Figure 2:
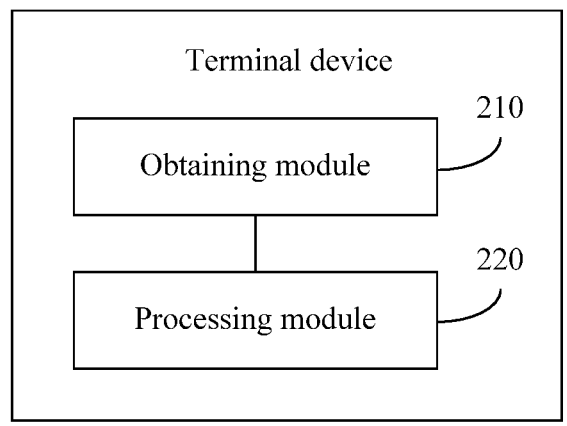
FIG. 2 is a schematic structural diagram of a terminal device according to an embodiment of this application.

FIG. 2 is a schematic structural diagram of a terminal device according to an embodiment of this application. The terminal device is configured to perform the motor vehicle self-driving method shown in FIG. 1. The terminal device may include an obtaining module 210 and a processing module 220.

The obtaining module 210 is configured to obtain first vehicle information of a first motor vehicle, where the first vehicle information includes a first positioning mode and a first driving route, and obtain second vehicle information of a second motor vehicle, where the second motor vehicle is located in a preset range of the first motor vehicle, and the second vehicle information includes a second positioning mode and a second driving route.

The processing module 220 is configured to determine whether the first driving route overlaps with the second driving route. When the first driving route overlaps with the second driving route, compare positioning precision of the first positioning mode with positioning precision of the second positioning mode, determine a positioning mode with higher positioning precision in the first positioning mode and the second positioning mode as a target positioning mode, determine a target driving parameter based on the target positioning mode, and control the first motor vehicle and the second motor vehicle to drive based on the target driving parameter.

According to the terminal device provided in this embodiment of this application, the obtaining module obtains the first vehicle information of the first motor vehicle, where the first vehicle information includes the first positioning mode and the first driving route, and obtains the second vehicle information of the second motor vehicle, where the second motor vehicle is located in the preset range of the first motor vehicle, and the second vehicle information includes the second positioning mode and the second driving route. The processing module determines whether the first driving route overlaps with the second driving route, when the first driving route overlaps with the second driving route, compares the positioning precision of the first positioning mode with the positioning precision of the second positioning mode, determines a positioning mode with higher positioning precision in the first positioning mode and the second positioning mode as the target positioning mode, determines the target driving parameter based on the target positioning mode, and controls the first motor vehicle and the second motor vehicle to drive based on the target driving parameter.

In this embodiment of this application, the terminal device determines the target driving parameter based on the target positioning mode, and the target positioning mode is a positioning mode with higher positioning precision in the first positioning mode and the second positioning mode. Therefore, security is relatively high when the terminal device controls the first motor vehicle and the second motor vehicle to drive based on the target driving parameter that is determined based on the target positioning mode. In addition, because the terminal device can control both the first motor vehicle and the second motor vehicle to drive based on the target driving parameter that is determined based on the target positioning mode, neither the first motor vehicle nor the second motor vehicle needs to use a high positioning mode, and therefore costs are relatively low.

Optionally, in a specific implementation of this embodiment of this application, the first vehicle information further includes first environment data of the first motor vehicle, and the second vehicle information further includes second environment data of the second motor vehicle. The processing module 220 is further configured to, when the target positioning mode is the first positioning mode, determine the target driving parameter based on the target positioning mode and the first environment data, or when the target positioning mode is the second positioning mode, determine the target driving parameter based on the target positioning mode and the second environment data.

Optionally, in a specific implementation of this embodiment of this application, the processing module 220 is further configured to determine a first driving parameter based on the target positioning mode, determine whether the first environment data includes a preset environment characteristic, and when the first environment data includes the preset environment characteristic, determine a first driving parameter offset based on the preset environment characteristic and the first driving parameter, and add the first driving parameter and the first driving parameter offset to obtain the target driving parameter, or when the first environment data does not include the preset environment characteristic, use the first driving parameter as the target driving parameter, or the processing module 220 is further configured to determine a second driving parameter based on the target positioning mode, determine whether the second environment data includes the preset environment characteristic, and when the second environment data includes the preset environment characteristic, determine a second driving parameter offset based on the preset environment characteristic and the second driving parameter, and add the second driving parameter and the second driving parameter offset to obtain the target driving parameter, or when the second environment data does not include the preset environment characteristic, use the second driving parameter as the target driving parameter.

Optionally, in a specific implementation of this embodiment of this application, the processing module 220 is further configured to determine, based on the first environment data and/or the second environment data, whether a vehicle self-driving condition is met, and when the vehicle self-driving condition is not met, prompt the first motor vehicle and the second motor vehicle to enter a manual driving mode.

Optionally, in a specific implementation of this embodiment of this application, the processing module 220 is further configured to, when the first driving route is separated from the second driving route, stop controlling the first motor vehicle or the second motor vehicle to drive based on the target driving parameter.

Optionally, in a specific implementation of this embodiment of this application, the obtaining module 210 is further configured to obtain third vehicle information of a third motor vehicle, where the third motor vehicle is located in the preset range of the first motor vehicle, and the third vehicle information includes a third positioning mode and a third driving route, and the processing module 220 is further configured to determine whether the first driving route overlaps with the third driving route, when the first driving route overlaps with the third driving route, compare positioning precision of the target positioning mode with positioning precision of the third positioning mode, and when the positioning precision of the target positioning mode is higher than the positioning precision of the third positioning mode, control the third motor vehicle to drive based on the target driving parameter, or when the positioning precision of the target positioning mode is lower than the positioning precision of the third positioning mode, determine a current driving parameter based on the third positioning mode, and control the first motor vehicle, the second motor vehicle, and the third motor vehicle to drive based on the current driving parameter.

Optionally, in a specific implementation of this embodiment of this application, the processing module 220 is further configured to, when the target positioning mode is the first positioning mode, use the first motor vehicle as a head vehicle and control the first motor vehicle and the second motor vehicle to drive based on the target driving parameter, or when the target positioning mode is the second positioning mode, use the second motor vehicle as a head vehicle and control the first motor vehicle and the second motor vehicle to drive based on the target driving parameter.

Figure 3:
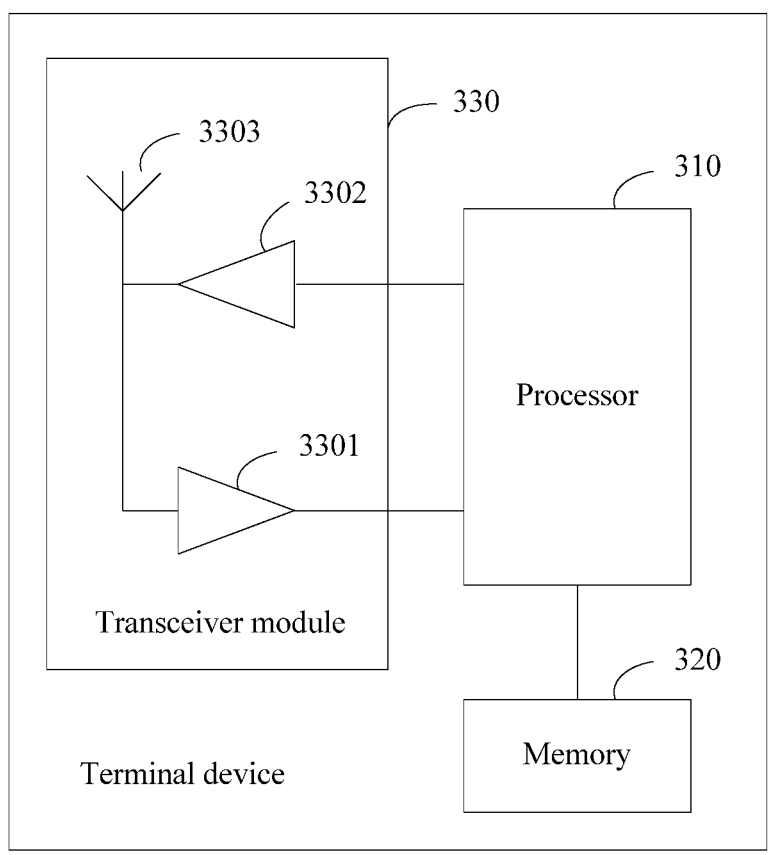
FIG. 3 is a schematic structural diagram of another terminal device according to an embodiment of this application.

FIG. 3 is a schematic structural diagram of a terminal device according to an embodiment of this application. The terminal device may be a terminal device in any one of the foregoing embodiments, and is configured to implement steps of the method in the foregoing embodiment.

As shown in FIG. 3, the terminal device may include a processor 310, a memory 320, and a transceiver module 330. The transceiver module 330 may include components such as a receiver 3301, a transmitter 3302, and an antenna 3303. The terminal device may further include more or fewer components, or combine some components, or have different component arrangements. This is not limited in this application.

The processor 310 is a control center of the terminal device, is connected to each part of the entire terminal device through various interfaces and lines, and performs various functions of the terminal device and/or processes data by running or executing a software program and/or a module stored in the memory 320, and invoking data stored in the memory 320. The processor 310 may include an integrated circuit (IC), for example, may include a single packaged IC, or may include a plurality of connected packaged ICs with a same function or different functions. For example, the processor 310 may include only a central processing unit (CPU), or may be a combination of a graphics processing unit (GPU), a digital signal processor (DSP), and a control chip (for example, a baseband chip) in the transceiver module. In various implementations of this application, the CPU may be a single computing core, or may include a plurality of computing cores.

The transceiver module 330 is configured to establish a communication channel such that the terminal device is connected to a receiving device through the communication channel, thereby transmitting data between terminal devices. The transceiver module may include communications modules such as a wireless local area network (WLAN) module, a BLUETOOTH module, and a baseband module, and radio frequency (RF) circuits corresponding to the communications modules. The transceiver module is configured to perform communication in a WLAN, Bluetooth communication, infrared communication, and/or communication in a cellular communications system, for example, wideband code division multiple access (WCDMA) and/or high speed downlink packet access (HSDPA). The transceiver module is configured to control communication between all the components in the terminal device, and may support direct memory access.

In different implementations of this application, transceiver modules in the transceiver module 330 are usually presented in a form of an IC chip, and may be selectively combined without a need to include all the transceiver modules and corresponding antenna groups. For example, the transceiver module 330 may include only a baseband chip, a RF chip, and a corresponding antenna, to provide a communication function in a cellular communications system. For example, the terminal device may be connected to a cellular network or the Internet using a wireless communication connection established by the transceiver module, for example, using WLAN access or WCDMA access. In some optional implementations of this application, the communication modules, for example, the baseband module, in the transceiver module may be integrated into the processor. A typical example is an application processor and mobile data modem (APQ+MDM) series platform provided by Qualcomm. The RF circuit is configured to send and receive information, or receive and send a signal in a call process. For example, the RF circuit receives downlink information of a network device and sends the downlink information to the processor for processing, and sends uplink-related data to the network device. Usually, the RF circuit includes a well-known circuit used to perform these functions, and includes but is not limited to an antenna system, a RF transceiver, one or more amplifiers, a tuner, one or more oscillators, a DSP, a coder/decoder (codec) chipset, a subscriber identity module (SIM) card, a memory, and the like. In addition, the RF circuit may further communicate with a network and another device through wireless communication. Any communications standard or protocol may be used for the wireless communication, including but not limited to a global system for mobile communications (GSM), a general packet radio service (GPRS), code division multiple access (CDMA), WCDMA, a high speed uplink packet access (HSUPA) technology, Long Term Evolution (LTE), an email, a short message service (SMS)), and the like.

In specific implementation, an embodiment of this application further provides a computer storage medium. The computer storage medium may store a program. When the program is executed, some or all of the steps in the embodiments of the motor vehicle self-driving method provided in the embodiments of this application may be performed. The storage medium may be a magnetic disk, an optical disc, a read-only memory (ROM), a random access memory (RAM), or the like.

A person skilled in the art may clearly understand that, the technologies in the embodiments of this application may be implemented by software in addition to a necessary general hardware platform. Based on such an understanding, the technical solutions in the embodiments of this application essentially or the part contributing to the other approaches may be implemented in a form of a software product. The computer software product may be stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments of this application.

The embodiments in this specification are all described in a progressive manner. For same or similar parts in the embodiments, reference may be made to these embodiments, and each embodiment focuses on a difference from other embodiments. Especially, system and apparatus embodiments are basically similar to a method embodiment, and therefore are described briefly. For related parts, refer to partial description in the method embodiment.

The foregoing descriptions are implementations of this application, but are not intended to limit the protection scope of this application. Any modification, equivalent replacement, and improvement made without departing from the spirit and principle of this application shall fall within the protection scope of this application.

What is claimed is:

1. A motor vehicle self-driving method, implemented by a terminal device, comprising:
   obtaining first vehicle information of a first motor vehicle, wherein the first vehicle information comprises a first positioning mode and a first driving route;
   obtaining second vehicle information of a second motor vehicle, wherein the second motor vehicle is located in a preset range of the first motor vehicle, wherein the second vehicle information comprises a second positioning mode and a second driving route;
   determining that the first driving route overlaps with the second driving route;
   comparing a first positioning precision of the first positioning mode with a second positioning precision of the second positioning mode based on determining that the first driving route overlaps with the second driving route;
   determining a target positioning mode comprising a higher positioning precision than the first positioning mode and the second positioning mode;
   determining a target driving parameter based on the target positioning mode; and
   controlling the first motor vehicle and the second motor vehicle to drive based on the target driving parameter.

2. The motor vehicle self-driving method of claim 1, wherein the first vehicle information further comprises first environment data of the first motor vehicle, and wherein the motor vehicle self-driving method further comprises determining the target driving parameter based on the target positioning mode and the first environment data when the target positioning mode is the first positioning mode.

3. The motor vehicle self-driving method of claim 1, wherein the second vehicle information further comprises second environment data of the second motor vehicle, and wherein the motor vehicle, self-driving method further comprises determining the target driving parameter based on the target positioning mode and the second environment data when the target positioning mode is the second positioning mode.

4. The motor vehicle self-driving method of claim 2, wherein determining the target driving parameter based on the target positioning mode and the first environment data when the target positioning mode is the first positioning mode comprises:
   determining a first driving parameter based on the target positioning mode;
   determining whether the first environment data comprises a preset environment characteristic; and
   either determining a first driving parameter offset based on the preset environment characteristic and the first driving parameter when the first environment data comprises the preset environment characteristic, and adding the first driving parameter and the first driving parameter offset to obtain the target driving parameter when the first environment data comprises the preset environment characteristic; or
   using the first driving parameter as the target driving parameter when the first environment data does not comprise the preset environment characteristic.

5. The motor vehicle self-driving method of claim 3, wherein determining the target driving parameter based on the target positioning mode and the second environment data when the target positioning mode is the second positioning mode comprises:
   determining a second driving parameter based on the target positioning mode;
   determining whether the second environment data comprises a preset environment characteristic; and
   either determining a second driving parameter offset based on the preset environment characteristic and the second driving parameter when the second environment data comprises the preset environment characteristic, and adding the second driving parameter and the second driving parameter offset to obtain the target driving parameter when the second environment data comprises the preset environment characteristic; or using the second driving parameter as the target driving parameter when the second environment data does not comprise the preset environment characteristic.

6. The motor vehicle self-driving method of claim 2, further comprising:
   determining, based on the first environment data, that a vehicle self-driving condition is not met; and
   prompting the first motor vehicle and the second motor vehicle to enter a manual driving mode based on determining the vehicle self-driving condition is not met.

7. The motor vehicle self-driving method of claim 3, further comprising:
   determining, based on the second environment data, that a vehicle self-driving condition is not met; and
   prompting the first motor vehicle and the second motor vehicle to enter a manual driving mode based on determining the vehicle self-driving condition is not met.

8. The motor vehicle self-driving method of claim 1, further comprising:
   making a determination the first driving route is separated from the second driving route; and
   stopping controlling the first motor vehicle or the second motor vehicle to drive based on the target driving parameter based on the determination that the first driving route is separated from the second driving route.

9. The motor vehicle self-driving method of claim 1, further comprising:
   obtaining third vehicle information of a third motor vehicle, wherein the third motor vehicle is located in the preset range of the first motor vehicle, wherein the third vehicle information comprises a third positioning mode and a third driving route;
   making a first determination the first driving route overlaps with the third driving route;
   comparing a third positioning precision of the target positioning mode with a fourth positioning precision of the third positioning mode based on the first determination the first driving route overlaps with the third driving route;
   determining whether the third positioning precision is higher than the fourth positioning precision; and
   either controlling the third motor vehicle to drive based on the target driving parameter when the third positioning precision is higher than the fourth positioning precision; or
   determining a current driving parameter based on the third positioning mode when the third positioning precision is lower than the fourth positioning precision; and
   controlling the first motor vehicle, the second motor vehicle, and the third motor vehicle to drive based on the current driving parameter when the third positioning precision is lower than the fourth positioning precision.

10. The motor vehicle self-driving method of claim 1, wherein controlling the first motor vehicle and the second motor vehicle to drive based on the target driving parameter comprises:
    either making a first determination the target positioning mode is the first positioning model; and
    using the first motor vehicle as a head vehicle to control the first motor vehicle and the second motor vehicle to drive based on the target driving parameter based on the first determination the target positioning mode is the first positioning mode; or
    making a second determination the target positioning mode is the second positioning model; and
    using the second motor vehicle as the head vehicle and controlling the first motor vehicle and the second motor vehicle to drive based on the target driving parameter based on the second determination the target positioning mode is the second positioning mode.

11. A terminal device, comprising:
    a receiver, configured to:
      obtain first vehicle information of a first motor vehicle, wherein the first vehicle information comprises a first positioning mode and a first driving route; and
      obtain second vehicle information of a second motor vehicle, wherein the second motor vehicle is located in a preset range of the first motor vehicle, and wherein the second vehicle information comprises a second positioning mode and a second driving route;
    a processor coupled to the receiver; and
    a memory coupled to the processor and the receiver and storing instructions that, when executed by the processor, cause the terminal device to be configured to:
      determine the first driving route overlaps with the second driving route;
      compare a first positioning precision of the first positioning mode with a second positioning precision of the second positioning mode based on determining that the first driving route overlaps with the second driving route;
      determine a target positioning mode comprising a higher positioning precision than the first positioning mode and the second positioning mode;
      determine a target driving parameter based on the target positioning mode; and
      control the first motor vehicle and the second motor vehicle to drive based on the target driving parameter.

12. The terminal device of claim 11, wherein the first vehicle information further comprises first environment data of the first motor vehicle, and wherein the instructions further cause the terminal device to be configured to determine the target driving parameter based on the target positioning mode and the first environment data when the target positioning mode is the first positioning mode.

13. The terminal device of claim 11, wherein the second vehicle information further comprises second environment data of the second motor vehicle, and wherein the instructions further cause the terminal device to be configured to determine the target driving parameter based on the target positioning mode and the second environment data when the target positioning mode is the second positioning mode.

14. The terminal device of claim 12, wherein the instructions further cause the terminal device to be configured to:
    determine a first driving parameter based on the target positioning mode;
    determine whether the first environment data comprises a preset environment characteristic; and
    either determine a first driving parameter offset based on the preset environment characteristic and the first driving parameter when the first environment data comprises the preset environment characteristic, and add the first driving parameter and the first driving parameter offset to obtain the target driving parameter when the first environment data comprises the preset environment characteristic; or
    use the first driving parameter as the target driving parameter when the first environment data does not comprise the preset environment characteristic.

15. The terminal device of claim 13, wherein the instructions further cause the terminal device to be configured to:
  determine a second driving parameter based on the target positioning mode;
  determine whether the second environment data comprises a preset environment characteristic; and
  determine the second driving parameter offset based on the preset environment characteristic and the second driving parameter when the second environment data comprises the preset environment characteristic; and
  add the second driving parameter and the second driving parameter offset to obtain the target driving parameter when the second environment data comprises the preset environment characteristic; or
  use the second driving parameter as the target driving parameter when the second environment data does not comprise the preset environment characteristic.

16. The terminal device of claim 12, wherein the instructions further cause the terminal device to be configured to:
  determine, based on the first environment data, that a vehicle self-driving condition is not met; and
  prompt the first motor vehicle and the second motor vehicle to enter a manual driving mode based on determining the vehicle self-driving condition is not met.

17. The terminal device of claim 13, wherein the instructions further cause the terminal device to be configured to:
  determine, based on the second environment data, that a vehicle self-driving condition is not met; and
  prompt the first motor vehicle and the second motor vehicle to enter a manual driving mode based on determining the vehicle self-driving condition is not met.

18. The terminal device of claim 11, wherein the instructions further cause the terminal device to be configured to:
  make a first determination the first driving route is separated from the second driving route; and
  stop controlling the first motor vehicle or the second motor vehicle to drive based on the target driving parameter based on the first determination the first driving route is separated from the second driving route.

19. The terminal device of claim 11, wherein the receiver is further configured to obtain third vehicle information of a third motor vehicle, wherein the third motor vehicle is located in the preset range of the first motor vehicle, wherein the third vehicle information comprises a third positioning mode and a third driving route, and wherein the instructions further cause the terminal device to be configured to:
  determine the first driving route overlaps with the third driving route;
  compare a third positioning precision of the target positioning mode with a fourth positioning precision of the third positioning mode based on determining the first driving route overlaps with the third driving route; and
  determine whether the third positioning precision is higher than the fourth positioning precision; and
  either control the third motor vehicle to drive based on the target driving parameter when the third positioning precision is higher than the fourth positioning precision; or
  determine a current driving parameter based on the third positioning mode when the third positioning precision is lower than the fourth positioning precision; and
  control the first motor vehicle, the second motor vehicle, and the third motor vehicle to drive based on the current driving parameter when the third positioning precision is lower than the fourth positioning precision.

20. The terminal device of a claim 11, wherein the instructions further cause the terminal device to be configured to:
  use the first motor vehicle as a head vehicle and control the first motor vehicle and the second motor vehicle to drive based on the target driving parameter when the target positioning mode is the first positioning mode; or
  use the second motor vehicle as the head vehicle and control the first motor vehicle and the second motor vehicle to drive based on the target driving parameter when the target positioning mode is the second positioning mode.

* * * * *

UNITED STATES PATENT AND TRADEMARK OFFICE
CERTIFICATE OF CORRECTION

PATENT NO. : 11,243,529 B2  
APPLICATION NO. : 16/712574  
DATED : February 8, 2022  
INVENTOR(S) : Jiali Fu, Huimin Zhang and Maosheng Huang It is certified that error appears in the above-identified patent and that said Letters Patent is hereby corrected as shown below:

In the Claims

Claim 10, Column 19, Line 62: "positioning model; and" should read "positioning mode; and"

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*